United States Patent
Ostrander et al.

(10) Patent No.: US 8,475,052 B2
(45) Date of Patent: Jul. 2, 2013

(54) SHAFT SUPPORT ASSEMBLY

(75) Inventors: Robert Ostrander, Orchard Lake, MI (US); Dumitru Florin Patrascu, West Bloomfield, MI (US); Christopher Steele, Lake Orion, MI (US); Bradley Stark, Clinton Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 110 days.

(21) Appl. No.: 13/272,266

(22) Filed: Oct. 13, 2011

(65) Prior Publication Data

US 2013/0094793 A1 Apr. 18, 2013

(51) Int. Cl.
*F16C 33/76* (2006.01)
*F16C 27/00* (2006.01)

(52) U.S. Cl.
USPC .......................................... 384/484; 384/536

(58) Field of Classification Search
USPC .................. 384/536, 582, 484–486; 180/381
See application file for complete search history.

(56) References Cited

U.S. PATENT DOCUMENTS

| | | | | |
|---|---|---|---|---|
| 2,865,689 | A | * | 12/1958 | Anderson ...................... 384/536 |
| 2,897,023 | A | * | 7/1959 | Burkhalter et al. ........... 384/536 |
| 3,756,675 | A | * | 9/1973 | Mangiavacchi ............... 384/536 |
| 4,364,613 | A | * | 12/1982 | Mangiavacchi ............... 384/536 |
| 4,392,694 | A | * | 7/1983 | Reynolds ...................... 384/536 |
| 4,722,618 | A | * | 2/1988 | Matsumoto et al. .......... 384/536 |
| 4,865,470 | A | * | 9/1989 | Mazziotti ...................... 384/478 |
| 4,960,334 | A | * | 10/1990 | Mazziotti ...................... 384/486 |
| 5,551,783 | A | | 9/1996 | Whitney et al. |
| 5,829,892 | A | | 11/1998 | Groves |
| 6,406,373 | B1 | | 6/2002 | Gibson |

* cited by examiner

*Primary Examiner* — Thomas R Hannon
(74) *Attorney, Agent, or Firm* — Brooks Kushman P.C.

(57) ABSTRACT

A shaft support assembly that may include a mounting bracket, a dampener, a bearing retainer, a bearing, and a deflector. The deflector may be spaced apart from the dampener and may include a seal that engages the bearing retainer to inhibit contamination of the bearing.

20 Claims, 3 Drawing Sheets

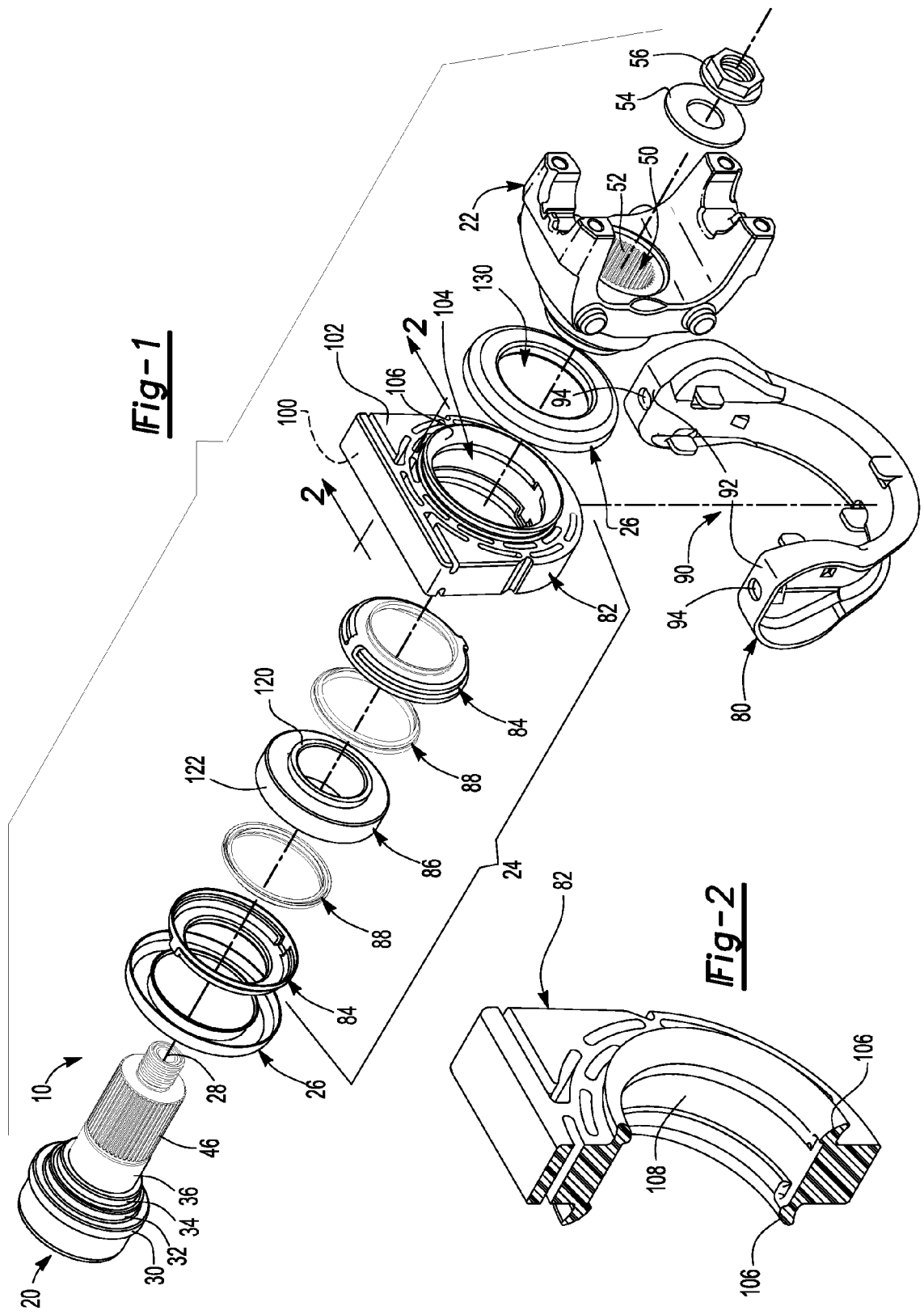

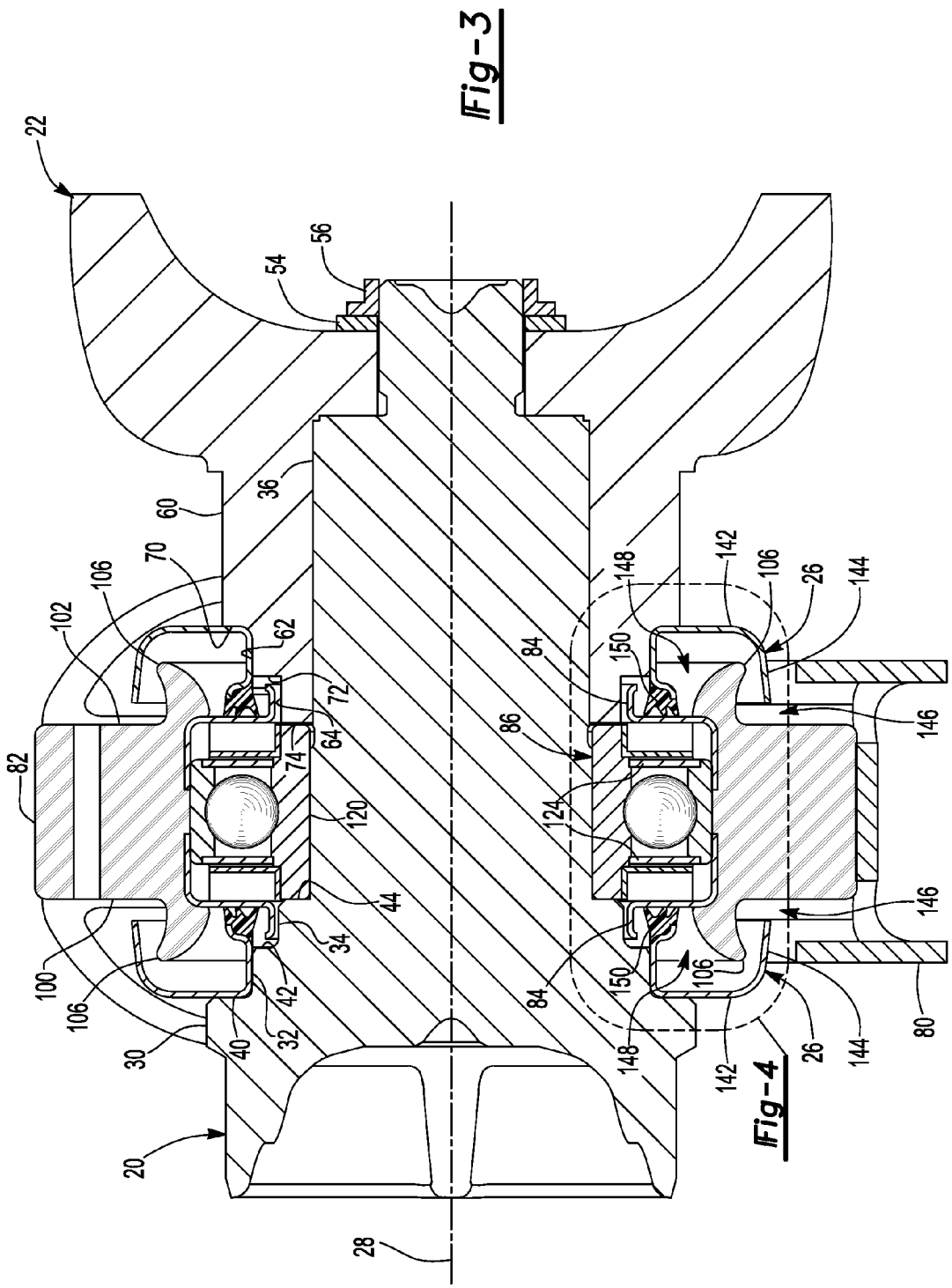

SHAFT SUPPORT ASSEMBLY

TECHNICAL FIELD

The present application relates to an assembly for supporting a shaft.

BACKGROUND

A bearing assembly adapted to support a rotatable shaft is disclosed in U.S. Pat. No. 5,551,783.

SUMMARY

In at least one embodiment, a shaft support assembly is provided. The shaft support assembly may include a mounting bracket, a dampener, a bearing retainer, a bearing, and a deflector. The dampener may be disposed proximate the mounting bracket and may have a hole. The bearing retainer may be disposed in the hole and may engage the dampener. The bearing may be disposed into the hole and may engage the bearing retainer. The deflector may be spaced apart from the dampener and may include a seal that engages the bearing retainer. The seal may inhibit contamination of the bearing.

In at least one embodiment, a shaft support assembly is provided. The shaft support assembly may include a shaft assembly, a deflector, and a bearing assembly. The deflector may extend around the shaft assembly and may include a seal. The bearing assembly may include a bearing, a bearing retainer, and a dampener. The bearing may rotatably support the shaft assembly. The bearing retainer may receive the bearing. The dampener may receive the bearing retainer. The deflector may be spaced apart from the dampener. The seal may engage the bearing retainer to inhibit contaminants from entering the bearing.

In at least one embodiment, a shaft support assembly is provided. The shaft support assembly may include a shaft, a yoke, first and second deflectors, and a bearing assembly. The yoke may be fixedly disposed on the shaft. The first and second deflectors may be fixedly disposed on the shaft and the yoke, respectively. The first and second deflectors may include first and second seals, respectively. The bearing assembly may include a bearing, first and second bearing retainers, and a dampener. The bearing may engage the shaft. The first and second bearing retainers may engage the bearing and may be spaced apart from the shaft and the yoke, respectively. The dampener may receive the first and second bearing retainers. The first and second seals may engage opposite sides of the first and second bearing retainers, respectively.

BRIEF DESCRIPTION OF THE DRAWINGS

FIG. 1 is an exploded perspective view of an exemplary shaft support assembly.

FIG. 2 is a section view of a dampener of the shaft support assembly along section line 2-2.

FIG. 3 is a section view of the shaft support assembly.

DETAILED DESCRIPTION

Figure 4:
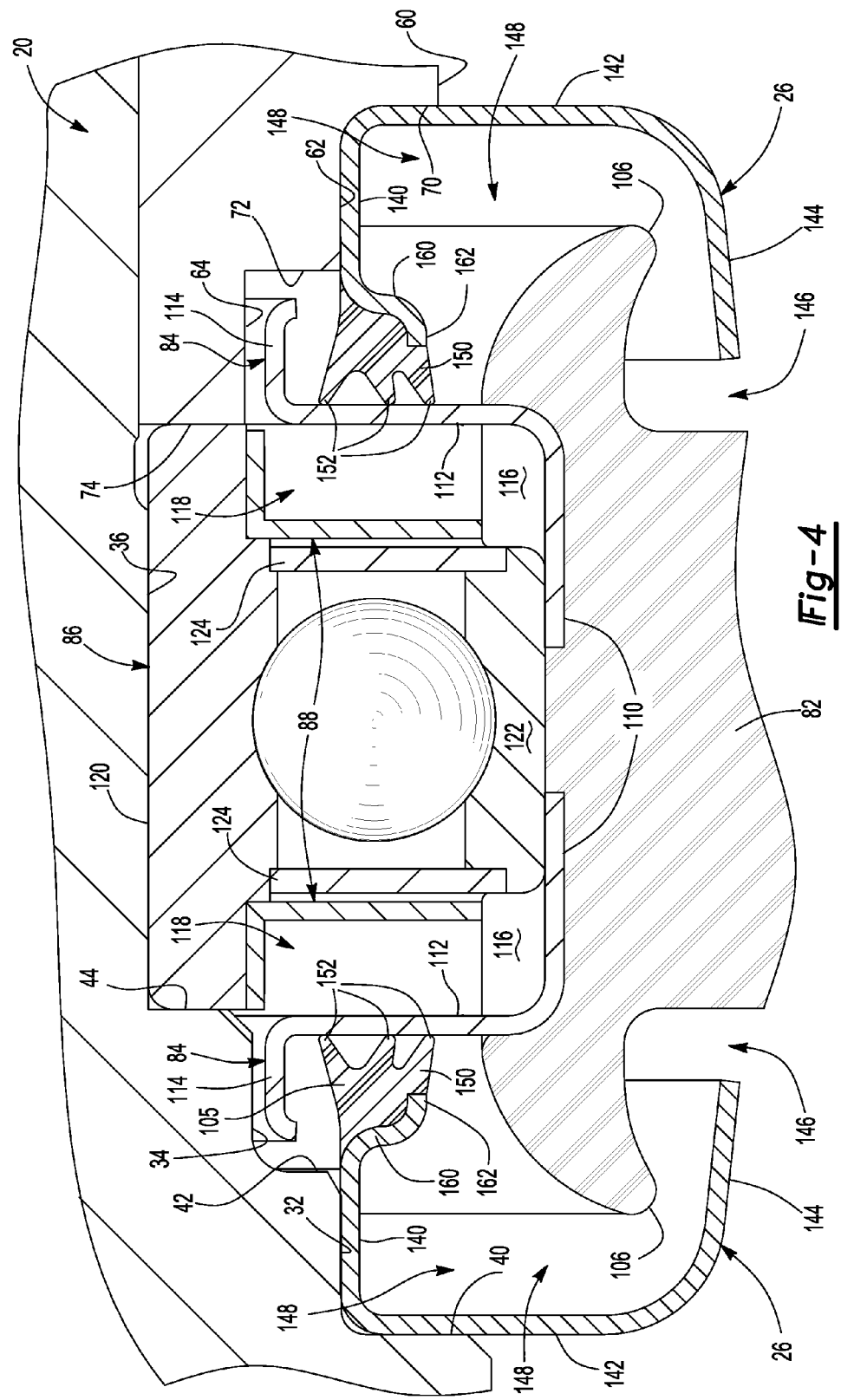
FIG. 4 is a magnified view of a portion of FIG. 3.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an exemplary shaft support assembly 10 is shown. In a vehicular application the shaft support assembly 10 may be provided as part of a vehicle driveline or drivetrain and may be disposed under the chassis of the vehicle. As such, the shaft support assembly 10 may be exposed to environmental contaminants, such as water, snow, mud, dirt, dust, aggregate, or corrosive substances. In at least one embodiment, the shaft support assembly 10 may include a shaft 20, a yoke 22, a bearing assembly 24, and at least one deflector 26.

Referring to FIGS. 1 and 3, a shaft 20 and yoke 22 are shown in more detail. The shaft 20 and yoke 22 may extend along and may be configured to rotate about an axis 28. In at least one embodiment, the shaft 20 and yoke 22 may be a driveshaft or part of a driveshaft assembly that may connect driveline components, such as connecting a transmission to a differential, transaxle, axle assembly, or the like.

The shaft 20 may include a plurality of circumferential surfaces that may be located between opposing ends of the shaft 20 and may be arranged to form a plurality of steps. For instance, the shaft 20 may include a first circumferential surface 30, a second circumferential surface 32, a third circumferential surface 34, and a fourth circumferential surface 36. The diameters of the circumferential surfaces 30, 32, 34, 36 may progressively decrease in size. For instance, the first circumferential surface 30 may have a larger diameter than the second circumferential surface 32, which may have a larger diameter than the third circumferential surface 34, which may have a larger diameter than the fourth circumferential surface 36. The circumferential surfaces 30, 32, 34, 36 may also be located next to each other such that a sequence of step surfaces extend between adjacent circumferential surfaces. For instance, a first step surface 40 may extend from the first circumferential surface 30 to the second circumferential surface 32, a second step surface 42 may extend from the second circumferential surface 32 to the third circumferential surface 34, and a third step surface 44 may extend from the third circumferential surface 34 to the fourth circumferential surface 36.

The shaft 20 may include various features that facilitate assembly to the yoke 22. For instance, the shaft 20 may include a spline 46 that may be provided on a portion of the fourth circumferential surface 36. In addition, an end of the shaft 20 may be threaded.

The yoke 22 may facilitate coupling of the shaft support assembly 10 to another component, such as a driveline component as previously discussed. In at least one embodiment, the yoke 22 may be configured as a universal joint. The yoke 22 may be fixedly disposed on the shaft 20 in any suitable manner. For instance, the yoke 22 may include a center bore 50 that may include a spline 52 that may mate with the spline 46 on the shaft 20. In addition, one or more fasteners, such as a washer 54 and nut 56, may be used to secure the yoke 22 to the shaft 20.

The yoke 22 may also have a similar arrangement of circumferential surfaces and step surfaces as the shaft 20. For example, the yoke 22 may include first, second, and third circumferential surfaces 60, 62, 64 that may have progressively decreasing diameters. In addition, the yoke 22 may have first, second, and third step surfaces 70, 72, 74. The first step surface 70 may extend from the first circumferential surface 60 to the second circumferential surface 62. The second step surface 72 may extend from the second circumferential surface 62 to the third circumferential surface 64. The third step surface 74 may extend from the third circumferential surface 64 to the center bore 50.

The bearing assembly 24 may be configured to rotatably support the shaft 20 and/or the yoke 22. In at least one embodiment, the bearing assembly 24 may include a mounting bracket 80, a dampener 82, a bearing retainer 84, a bearing 86, and optionally a flinger member 88.

The mounting bracket 80 may facilitate mounting of the bearing assembly 24 to a support surface, such as a chassis or body structure of the vehicle. In the embodiment shown, the mounting bracket 80 is generally U-shaped and at least partially defines a cavity 90 that receives the dampener 82. One or more mounting features, such as tabs, may extend into the cavity 90 and may be configured to position and secure the dampener 82 to the mounting bracket 80. The mounting bracket 80 may also include one or more flanges 92. The flanges 92 may have a hole 94 that may be configured to receive a fastener that may be used to mount the mounting bracket 80 to the support surface. The mounting bracket 80 may be made of any suitable material, such as a metal or metal alloy.

Referring to FIGS. 1 and 2, the dampener 82 may be configured to flex and dampen vibrations that may be associated with movement of the shaft 20 and driveline. For example, the dampener 82 may be made of rubber and may include a plurality of holes that may extend at least partially through the dampener 82 to facilitate flexing. The dampener 82 may be configured to receive the bearing retainer 84 and the bearing 86. In at least one embodiment, the dampener 82 may include a first surface 100, a second surface 102, and an opening 104. The opening 104 may generally extend between the first and second surfaces 100, 102 and may be centered about the axis 28. A protrusion ring 106 may extend outwardly from the first and second surfaces 100, 102. Each protrusion ring 106 may extend continuously around the opening 104. A groove 108 may be disposed in the opening 104 between the protrusion rings 106 to facilitate retention of the bearing retainer 84 and/or the bearing 86.

Referring to FIGS. 3 and 4, at least one bearing retainer 84 may be provided to help retain and position the bearing 86. In at least one embodiment, a pair of bearing retainers 84 may be provided that are disposed on opposite sides of the bearing 86. The bearing retainer 84 may include a first wall 110, a second wall 112, and a third wall 114. The first wall 110 may be disposed between the dampener 82 and an outer race of the bearing 86. In addition, the first wall 110 may extend substantially parallel to the axis 28 and may be at least partially disposed in the groove 108. The second wall 112 may extend from the first wall 110 toward the axis 28 and may be disposed substantially perpendicular to the first wall 110 in one or more embodiments. The third wall 114 may extend from an end of the second wall 112 and away from the bearing 86. In at least one embodiment, the third wall 114 may be disposed substantially perpendicular to the second wall 112. The second and third walls 112, 114 may be spaced apart from the shaft 20 and the yoke 22 so as not to impede rotation of these components. In addition, a spacer feature 116 may be disposed on or provided with the first and/or second walls 110, 112 in one or more embodiments. The spacer feature 116 may help separate the bearing 86 from at least a portion of the second wall 112, thereby forming a cavity 118 between the bearing 86 and the second wall 112. The cavity 118 may receive a lubricant, such as grease, that may be provided to reduce friction and block contaminants from entering the bearing 86. In addition, lubricant may also flow from the cavity 118 around the bearing retainer 84 to help lubricate a seal on the deflector 26.

The bearing 86 may rotatably support the shaft 20. The bearing 86 may be of any suitable type, such as a roller bearing. In at least one embodiment, the bearing 86 may rotate about the axis 28 and may include an inner race 120, an outer race 122, and a pair of shields 124.

The inner race 120 may engage a surface of the shaft 20, such as the fourth circumferential surface 36. In addition, opposing end surfaces of the inner race 120 may engage the third step surface 44 of the shaft 20 and/or the third step surface 74 of the yoke 22 to inhibit axial movement. As is best shown in FIG. 3, the inner race 120 may be disposed closer to the axis 28 than the deflectors 26 and at least a portion of the bearing retainer 84.

The outer race 122 may be disposed opposite the inner race 120. The outer race 122 may engage the bearing retainer 84 and/or the dampener 82.

The shields 124 may extend from the inner race 120 to the outer race 122. In addition, the shields 124 may be spaced apart from the bearing retainer 84. As such, the shields 124 may at least partially define the cavity 118 between the bearing 86 and the bearing retainer 84.

One or more flinger members 88 may be disposed in the cavity 118 and may be press fit onto the inner race 120 of the bearing 86. In the embodiment shown, two flinger members 88 are provided on opposite sides of the bearing 86. The flinger member 88 may help protect against impingement damage along the sides of the bearing 86. In addition, the flinger member 88 may also help purge contaminants away from the sides of the bearing 86 as the flinger member 88 rotates with the inner race 120. In at least one embodiment, the flinger member 88 may be configured as a ring that extends around the inner race 120 and that may have a generally L-shaped cross-section.

Referring to FIG. 1, one or more deflectors 26 may partially encapsulate and help shield the bearing assembly 24. In the embodiment shown, a pair of deflectors 26 are provided that are positioned on opposite sides of the bearing assembly 24. The deflector 26 may be generally ring-shaped and may define an opening 130 that receives the shaft 20 and/or the yoke 22. In at least one embodiment, a first deflector 26 may be fixedly disposed on the shaft 20 and a second deflector 26 may be fixedly disposed on the yoke 22.

Referring to FIGS. 3 and 4, the deflector 26 may include a first wall 140, a second wall 142, and a third wall 144. The first wall 140 may engage the second circumferential surface 32 of the shaft 20 or second circumferential surface 62 of the yoke 22. The second wall 142 may generally extend away from the axis 28 and may be disposed substantially perpendicular to the first wall 140. The second wall 142 may engage the first step surface 40 of the shaft 20 or the first step surface 70 of the yoke 22 to help position the deflector 26. The third wall 144 may extend from an end of the second wall 142 toward the dampener 82. In addition, the third wall 144 may be spaced apart from the dampener 82 such that a gap 146 is formed between an end of the third wall 144 and the dampener 82. The first, second, and third walls 140, 142, 144 may cooperate to help define a deflector cavity 148 into which the protrusion ring 106 extends. The gap 146 may facilitate movement and self-alignment of the bearing assembly 24 with respect to the shaft 20 and/or yoke 22 and may permit contaminants to exit the deflector cavity 148.

A seal 150 may be provided on the deflector 26. The seal 150 may engage a portion of the bearing retainer 84, such as the second wall 112, to inhibit contaminants from getting past the seal 150 and between the bearing retainer 84 and the shaft 20 and/or the yoke 22 and into the bearing 86. In addition, the seal 150 may be spaced apart from the third wall 114 of the bearing retainer 84. The seal 150 may be made of any suitable material, such as rubber. The seal 150 may include one or more lips 152 that may be spaced apart from each other. In addition, the seal 150 may permit excess lubricant in the cavity 118 pass around the bearing retainer 84 to the seal 150 and/or exit the bearing assembly 24 via the deflector cavity 148 and the gap 146.

In at least one embodiment, the seal 150 may be overmolded onto a portion of the deflector 26, such as a portion of the first wall 140 of the deflector 26 that may be spaced apart from the shaft 20 or the yoke 22. For example, an end of the first wall 140 may include a first portion 160 and a second portion 162. For a deflector 26 disposed on the shaft 20, the first portion 160 may be spaced apart from and extend away from the third circumferential surface 34 and the second portion 162 may extend from an end of the first portion 160 toward the bearing retainer 84. For a deflector 26 disposed on the yoke 22, the first portion 160 may be spaced apart from and extend away from the third circumferential surface 64 and the second portion 162 may extend from an end of the first portion 160 toward the bearing retainer 84. As such the first and second portions 160, 162 may cooperate to support the seal 150 from multiple directions and may help shield at least a portion of the seal 150 from environmental contaminants that may be disposed in the deflector cavity 148.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A shaft support assembly comprising:
a mounting bracket;
a dampener disposed proximate the mounting bracket, the dampener having a hole;
a bearing retainer disposed in the hole that engages the dampener;
a bearing disposed in the hole that engages the bearing retainer; and
a deflector that is spaced apart from the dampener and that includes a seal that engages the bearing retainer, wherein the seal inhibits contamination of the bearing.

2. The shaft support assembly of claim 1 wherein the deflector is disposed on a driveshaft assembly and is spaced apart from the mounting bracket and the bearing.

3. The shaft support assembly of claim 1 further comprising a cavity disposed between the bearing retainer and the bearing that is configured to receive a lubricant.

4. The shaft support assembly of claim 3 wherein the bearing further comprises an inner race and a flinger member that is disposed on the inner race, wherein the cavity is disposed between the flinger member and the bearing retainer.

5. The shaft support assembly of claim 4 wherein the flinger member is spaced apart from the bearing retainer.

6. The shaft support assembly of claim 1 wherein the bearing is configured to rotate about an axis and the bearing retainer includes a first wall that engages the dampener and the bearing, and a second wall that extends from the first wall toward the axis, wherein the seal engages the second wall.

7. The shaft support assembly of claim 6 wherein the bearing retainer includes a third wall that extends from an end of the second wall away from the bearing, wherein the seal is spaced apart from the third wall.

8. The shaft support assembly of claim 1 wherein the seal includes a plurality of spaced apart lips that engage the bearing retainer.

9. A shaft support assembly comprising:
a shaft assembly disposed along an axis;
a deflector that extends around the shaft assembly and has a seal; and
a bearing assembly that includes:
a bearing that rotatably supports the shaft assembly;
a bearing retainer that receives the bearing; and
a dampener that receives the bearing retainer;
wherein the deflector is spaced apart from the dampener and the seal engages the bearing retainer to inhibit contaminants from entering the bearing.

10. The shaft support assembly of claim 9 wherein the deflector defines a deflector cavity and the dampener includes a protrusion ring that extends around the axis, wherein the protrusion ring is disposed in the deflector cavity and is spaced apart from the deflector.

11. The shaft support assembly of claim 9 wherein the deflector includes a first deflector wall that engages the shaft assembly, wherein the seal is disposed on an end of the first deflector wall.

12. The shaft support assembly of claim 11 wherein the deflector includes a second deflector wall that engages the shaft assembly and extends from the first deflector wall, and a third deflector wall that extends from the second deflector wall toward the dampener, wherein the protrusion ring is disposed between the first and third deflector walls.

13. The shaft support assembly of claim 11 wherein the end of the first deflector wall includes a first portion that extends away from the axis and a second portion that extends from the first portion toward the bearing retainer, wherein the seal engages the first and second portions.

14. The shaft support assembly of claim 13 wherein the bearing retainer includes a first wall that engages the bearing and the dampener and a second wall that extends from an end of the first wall and that engages the seal.

15. The shaft support assembly of claim 14 wherein the bearing retainer includes a third wall that extends from an end of the second wall, wherein the seal is disposed between the third wall and the second portion of the first deflector wall.

16. A shaft support assembly comprising:
a shaft configured to rotate about an axis;
a yoke that is fixedly disposed on the shaft;
first and second deflectors fixedly disposed on the shaft and the yoke, respectively, wherein the first and second deflectors include first and second seals, respectively; and
a bearing assembly including:
a bearing that engages the shaft;
first and second bearing retainers that engage the bearing, the first and second bearing retainers being spaced apart from the shaft and the yoke, respectively; and
a dampener that receives the first and second bearing retainers;
wherein the first and second seals engage opposite sides of the first and second bearing retainers, respectively.

17. The shaft support assembly of claim 16 wherein the bearing includes an inner race that engages the shaft and the yoke.

18. The shaft support assembly of claim 16 wherein the first deflector includes a first wall that engages the shaft and has an end portion that is spaced apart from the shaft, wherein the first seal is disposed on the end portion.

19. The shaft support assembly of claim 16 wherein the bearing includes an inner race and the first bearing retainer includes a second wall that extends from the first wall, wherein the second wall is disposed further from the axis than the inner race.

20. The shaft support assembly of claim 16 wherein the shaft extends through a hole in the first and second deflectors and the yoke extends through a hole in the second deflector.

* * * * *